(No Model.) 3 Sheets—Sheet 1.

L. WEIL.
VALVE LOCK.

No. 443,885. Patented Dec. 30, 1890.

WITNESSES:
E. R. Knowles.

INVENTOR
Leopold Weil
BY Ernest C. Webb
ATTORNEY.

(No Model.) 3 Sheets—Sheet 2.
L. WEIL.
VALVE LOCK.

No. 443,885. Patented Dec. 30, 1890.

WITNESSES:
E. R. Knowles.
Fredric Carragan

INVENTOR
Leopold Weil
BY Ernest W. Robe
ATTORNEY.

(No Model.) 3 Sheets—Sheet 3.

L. WEIL.
VALVE LOCK.

No. 443,885. Patented Dec. 30, 1890.

WITNESSES.
E. R. Knowles.
Fredric Carragan

INVENTOR
Leopold Weil
BY Ernest C. Webb
ATTORNEY.

UNITED STATES PATENT OFFICE.

LEOPOLD WEIL, OF NEW YORK, N. Y.

VALVE-LOCK.

SPECIFICATION forming part of Letters Patent No. 443,885, dated December 30, 1890.

Application filed April 1, 1890. Serial No. 346,234. (No model.)

*To all whom it may concern:*

Be it known that I, LEOPOLD WEIL, a citizen of the United States, residing at New York city, in the county and State of New York, have invented certain new and useful Improvements in Valve-Locks, of which the following is a description.

This invention relates, generally, to a valve-lock for controlling the supply of water to a building; and it relates particularly to a special class of valve-locking mechanism whereby in the act of closing the building at night it is necessary to first close the valve and then operate the mechanism by which the valve is locked in its closed position before the key employed to lock the store or building can be removed from the valve-locking mechanism and used to operate the lock employed to close said store or building.

It is a matter of common knowledge that in large warehouses and other buildings used for business purposes valuable merchandise and other property are frequently injured or entirely destroyed by the overflow or leakage of water, and this is ordinarily due to the negligence of some person intrusted with the duty of shutting off the supply-pipe and closing the building at night.

The object of my invention, therefore, is to provide locking mechanism for such supply-pipe of simple and inexpensive construction, and so arranged with relation to the valve for such supply-pipe, and so combined with the key employed to lock the store or building that it will be impossible to lock said store or building without first closing and then locking in its closed position the valve of said supply-pipe.

A further object is to prevent any one from operating the valve and opening the supply-pipe after the building has been closed for the night.

To this end my invention consists in a valve for closing the supply-pipe of a building, a lock for holding said valve in its closed position and provided with a bolt which can only be projected to hold said valve when the valve is closed to shut off the water-supply, and a key for said lock which can only be removed therefrom when the valve is closed and the bolt projected.

My invention also includes details of construction, all as hereinafter more fully described, and pointed out in the claims.

Figure 1:
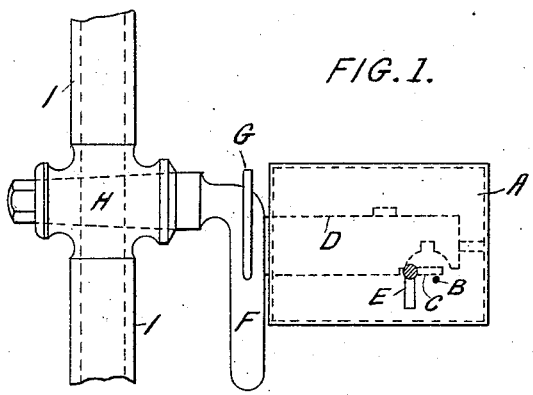
Figure 2:
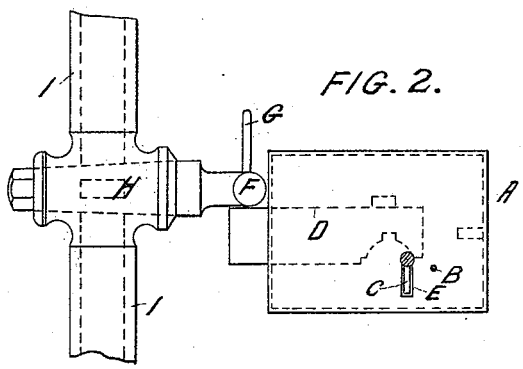
Figure 3:
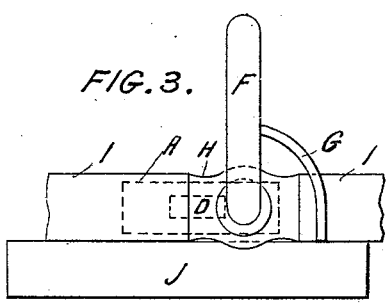
Figure 4:
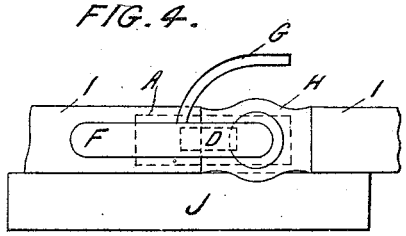

In the accompanying drawings, illustrating my invention, Figure 1 is a front view in elevation of a valve and lock embodying my invention, the lock mechanism being partially shown by dotted lines. In this view the valve is open. Fig. 2 is a similar view with the valve closed and locked in its closed position. Fig. 4 is a side view of Fig. 1, and Fig. 3 is a side view of Fig. 2. Figs. 5, 6, 7, 8, 9, 10, 11, 12, 13, 14, 15, and 16 illustrate modifications of my invention.

In Figs. 1, 2, 3, and 4 of the drawings, I designates the water-supply pipe for a building or store, having a valve H connected thereto, by means of which the supply of water to the building or store can be controlled or entirely shut off. This valve may be of any ordinary construction, and is provided with a handle F, having attached thereto and projecting therefrom a curved rod G, which, when the valve is turned to shut off the water, acts as a stop to prevent the valve from being moved beyond a certain predetermined point. (See Fig. 3.) This is essential, because if an ordinary plug-valve is used the ways or ports will be again opened and permit the passage of water if the valve-handle is permitted to move past a certain fixed point. The lock A is provided with a bolt D, key-hole E, and stop B. This lock is to be operated by a key C, which must also fit the lock employed to close the building or store. When the valve is open, as shown in Figs. 1 and 4, the bolt D is housed in the lock-casing, as shown by dotted lines in Fig. 1, and in this position the key cannot be removed from the lock, because the stop B prevents it from turning completely around and into the key-hole. When the valve is closed, as shown in Figs. 2 and 3, the bolt D is projected outwardly and impinges against the valve-handle, and in this position the bolt D and stop G prevent the valve-handle from being moved in either direction until the bolt is forced back into the lock. When the bolt is projected and the valve closed, the key C can be turned in a forward direction until it drops into the key-hole, when it can be removed. By this arrangement the building must be first unlocked before the water can be turned on, and after the water has been turned on the key cannot be removed from the lock until the valve has been turned to shut the water off, when, as stated, the valve will be securely held in its closed position. It follows from this that the building cannot be closed and locked at night without first shutting off the water-supply, and it is therefore obvious that the doing of this act will not be dependent upon the carefulness of the person whose duty it is to close the building.

Figure 5:
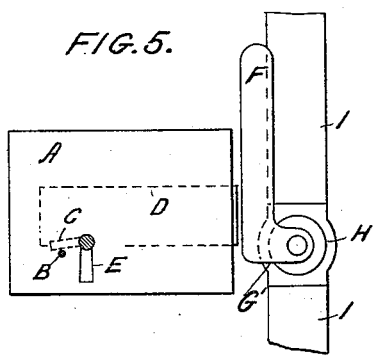
Figure 6:
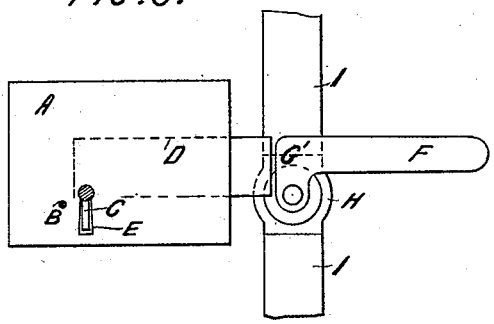
Figure 7:
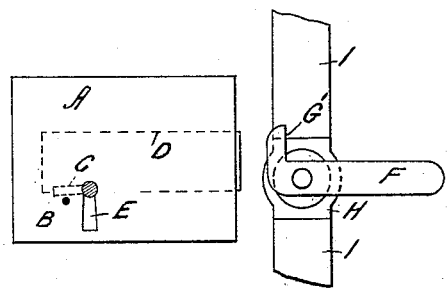
Figure 8:
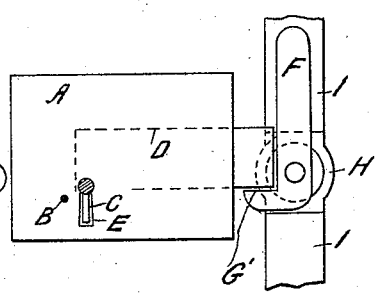

In the modification of my invention shown in Figs. 5 and 6 the several parts and the letters of reference used to designate them are the same as those just described, excepting that the valve-handle F moves to and from the bolt D, and is provided with a plain face G', against which the bolt D impinges when it is projected and the valve is closed. This is also true of the modification shown in Figs. 7 and 8, excepting that instead of the plain face G' a lug or projection G' is employed, over which the bolt D projects, and the valve is thus prevented from turning.

Figure 9:
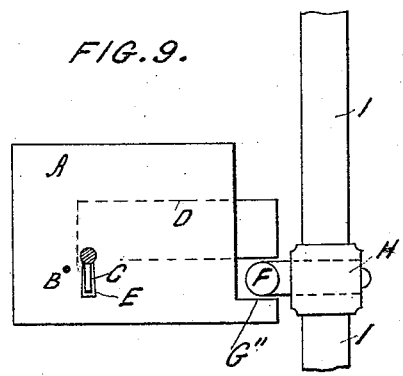
Figure 10:
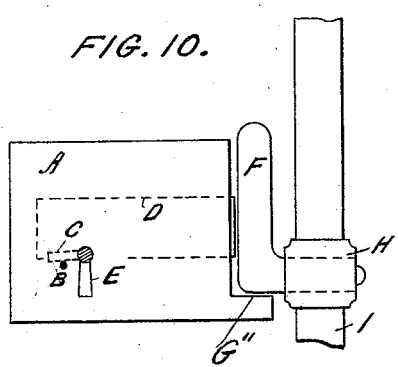

In the modification shown in Figs. 9 and 10 the valve-handle F swings to the right and left of the lock A, and the lock is provided with a projection G², which serves as a stop for the valve-handle in its closed position, Fig. 9, preventing the handle from moving beyond a certain predetermined point, and serving, in combination with the projected bolt, to prevent the valve-handle from being turned to open the valve until the key has been introduced into the lock and operated to withdraw the bolt.

Figure 11:
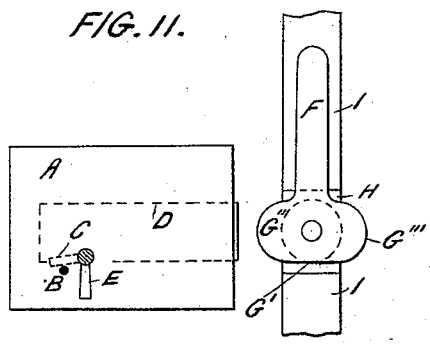
Figure 12:
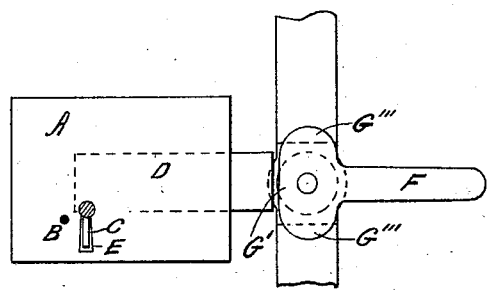

In the modification shown in Figs. 11 and 12 the valve-handle moves to and from the bolt, and is provided with a cam-shaped piece G³, the plain face of which is opposite the bolt when the latter is projected, as shown in Fig. 12, and the handle cannot be moved to open the valve until the bolt is withdrawn.

Figure 13:
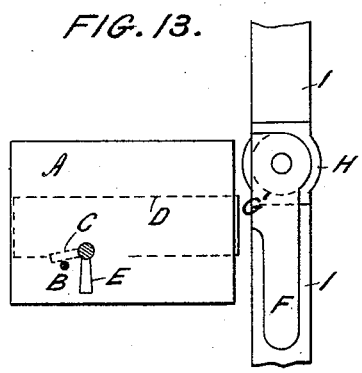
Figure 14:
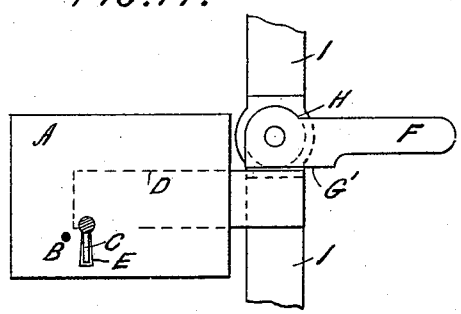
Figure 15:
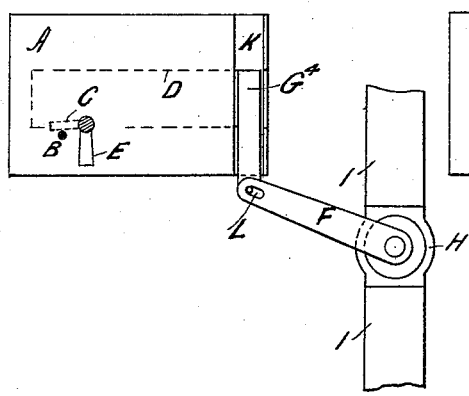
Figure 16:
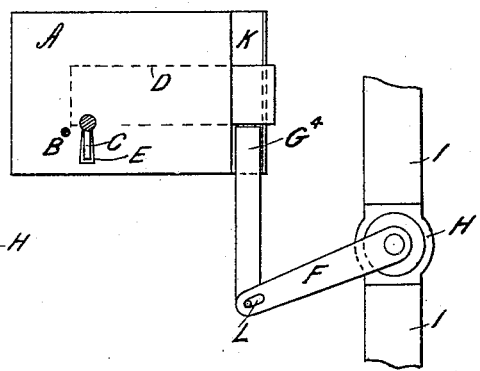

In the modification shown in Figs. 13 and 14 the valve-handle also moves to and from the bolt, and is provided with a plain face G'; but in this case, when the bolt is projected outwardly, as shown in Fig. 14, the valve-handle is arranged above it and cannot be moved downwardly or upwardly to open the valve until the bolt is withdrawn, The modification shown in Figs. 15 and 16 is specially designed for connection with valves so arranged in the walls of buildings that the lock cannot be set in sufficiently close relation to the valve, so that the bolt can be projected against the valve-handle, as hereinabove described. In this modification the lock is provided with the slot K in the front thereof, in which a plunger G⁴ is set, and this plunger is pivotally connected at L to the valve-handle F. When the valve is open, as shown in Fig. 15, the plunger G⁴ is contained within the slot, and when the valve is closed, as shown in Fig. 16, the plunger G⁴ is partially withdrawn from the slot, its upper edge bearing against the projected bolt D, and the valve cannot be opened until the bolt is drawn back into the lock and moved out of the path of the plunger in the slot.

In all the cases described the lock is provided with a stop B, which prevents the key from being withdrawn from the lock until the valve is closed and the bolt D projected.

It is obvious that my invention may be applied to steam and gas pipes as well as to water-pipes, and it is also obvious that I may employ a special form of lock for both the valve and the building, instead of using locks now on the market, and in doing this I do not consider that I will depart from the principle of my invention as above described. It is also obvious that I may employ a suitable drain for the valve of any of the common forms now on the market.

What I claim as my invention, and desire to secure by Letters Patent, is—

1. A valve for closing the supply-pipe of a building, a lock for holding said valve in its closed position and provided with a bolt which can only be projected to firmly hold said valve when the valve is closed to shut off the water-supply, and a key for said lock which can only be removed therefrom when the valve is closed and the bolt projected, substantially as described.

2. In valve-locking mechanism of substantially the construction described, the combination of a valve, a handle for said valve, and a stop arranged to prevent said valve-handle from moving beyond a certain fixed point, with a locking device comprising a frame, a bolt arranged in said frame, a key for projecting said bolt to hold the valve-handle in the closed position of the valve, and a stop for preventing said key from being removed from the lock-frame until said bolt has been projected outwardly, as and for the purposes set forth.

3. The combination, in a system for controlling the supply of water to a building, comprising a supply-pipe I, and valve H arranged therein, of the valve-handle F, with a lock A, having a bolt D, adapted to be projected against the valve-handle to hold the valve in its closed position, substantially as described.

In testimony whereof I have hereunto set my hand this 21st day of March, A. D. 1890.

LEOPOLD WEIL.

Witnesses:
ISAAC WEIL,
WM. MICHAELSON.